Nov. 19, 1935.  C. A. OTTO  2,021,263
REVERSIBLE THERMOSTATIC SYSTEM
Filed Oct. 5, 1932  2 Sheets-Sheet 1
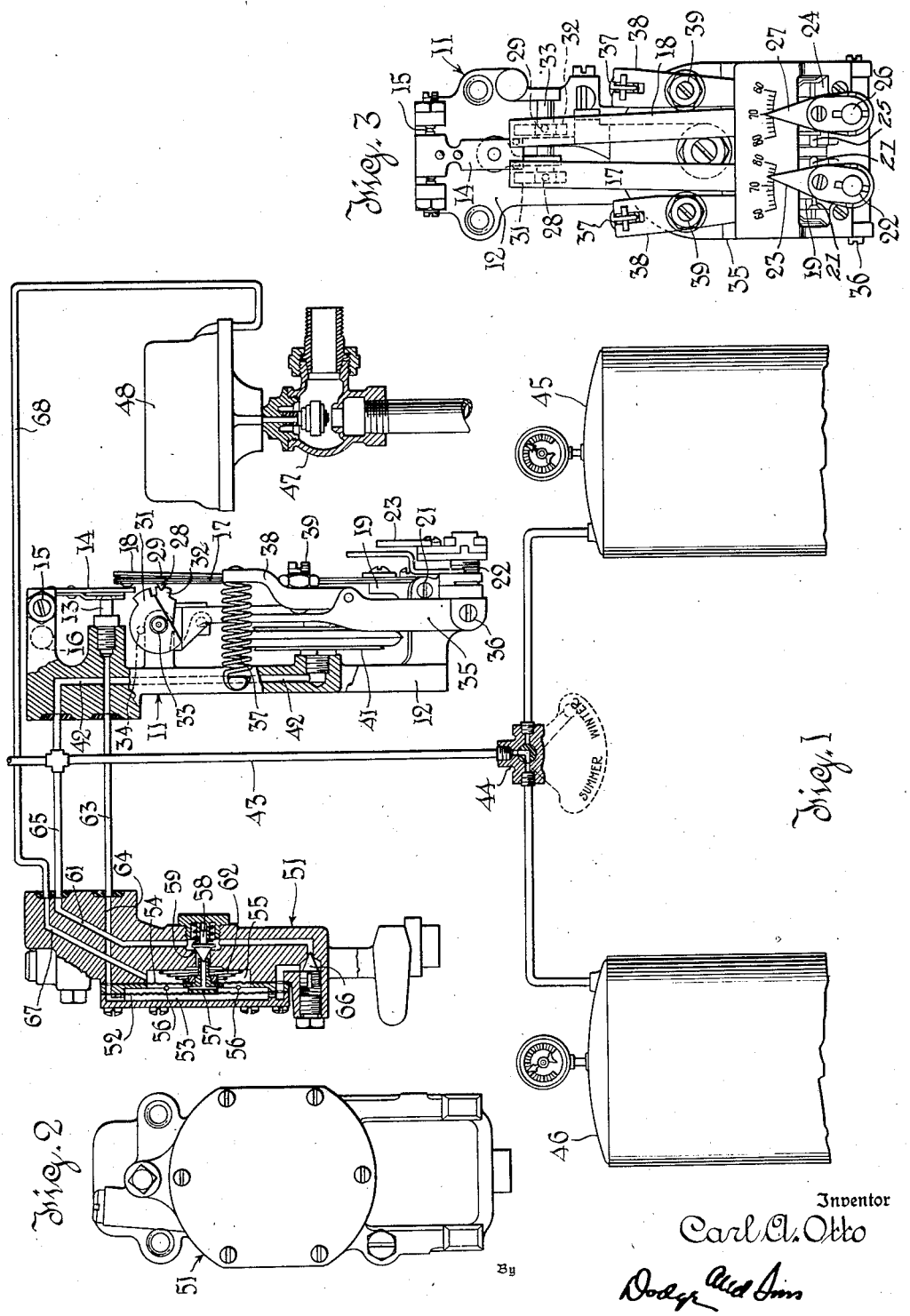
Inventor
Carl A. Otto
By
Dodge and Sons
Attorneys

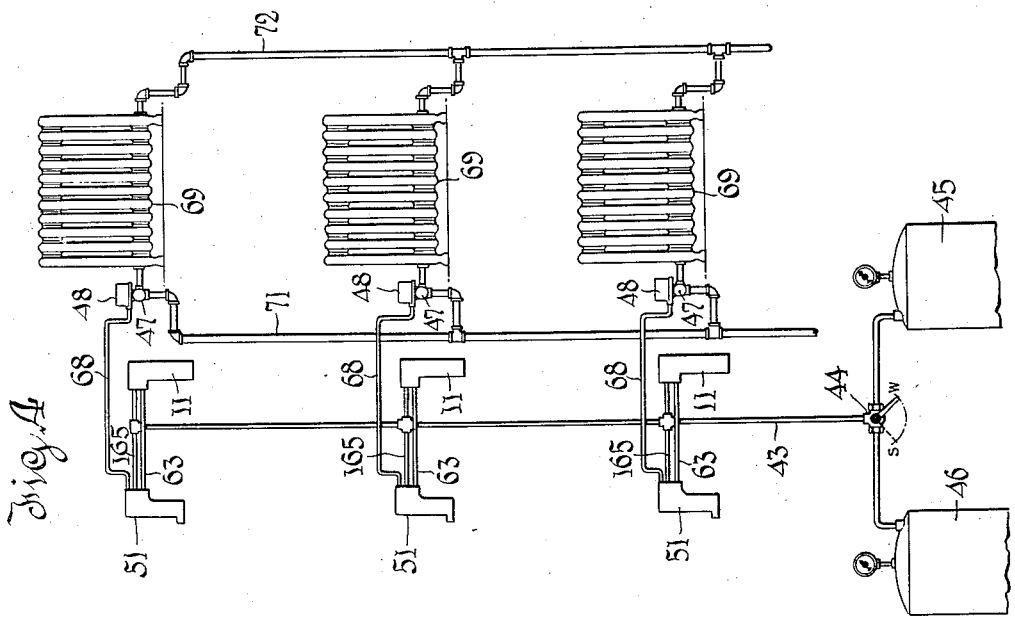

Patented Nov. 19, 1935

2,021,263

UNITED STATES PATENT OFFICE 2,021,263

REVERSIBLE THERMOSTATIC SYSTEM

Carl A. Otto, Milwaukee, Wis., assignor to Johnson Service Company, Milwaukee, Wis., a corporation of Wisconsin Application October 5, 1932, Serial No. 636,418

6 Claims. (Cl. 236—1)

This invention relates to temperature control, and particularly to the control of heat exchange systems which at times operate to heat and at other times operate to cool rooms or other enclosed spaces.

In certain systems of this character, radiators are used in the various rooms, and the system is operated, according to conditions at different times to circulate a heating medium or a cooling medium through these radiators. The radiator valves in heating systems are commonly controlled by thermostats, there being a thermostat in each room which controls the valve or valves controlling one or more radiators in that room. In a heating system the thermostat must close the valve on rising temperature and open it on falling temperature, but in a cooling system this action must be reversed. It is also desirable that the thermostats function to maintain two somewhat different uniform temperatures under the two conditions specified.

The purpose of the present invention is to provide a thermostatic control system in which a single thermostatic installation will control radiator valves in either of the two, relatively reversed relations, and if desired may operate to maintain different temperatures according to the operative characteristics of the heat exchange system at the time; and in which the thermostatic control system as a whole may be set from a central point to operate in either of the two characteristically different modes above specified.

The invention is susceptible of embodiment in various ways, and for explanation will be described as applied to pneumatic thermostat systems. Other embodiments form the subject matter of a divisional application, Serial No. 25,152 filed June 5, 1935.

In the drawings,—

Fig. 1 is a view partly in section, and diagrammatic in character, showing a pneumatic installation for one room connected to the pressure fluid sources.

Fig. 2 is a front elevation of the relay shown in section in Fig. 1.

Fig. 3 is a front elevation of the reversible thermostatic unit shown in partial section in Fig. 1.

Fig. 4 is a diagram showing how the equipment of Fig. 1 is connected to control the temperature in a plurality of rooms.

Referring first to Figs. 1, 2 and 3, the room installation includes a radiator valve with pneumatic motor, and a leak port thermostat having two reversely acting thermostatic elements which become selectively operative according as one or another supply pressure is established in the air supply line. I prefer to interpose between the leak port thermostat and the radiator valve motor a relay to accelerate the effect of opening and closing of the leak port on the valve motor, but systems omitting the relay are known and the relay is not indispensable.

The leak port thermostat is generally indicated by the numeral 11 and has a base frame 12 on which is mounted a minutely apertured leak port 13 and a coacting valve member 14 pivoted at 15 and yieldingly urged in an opening direction by any suitable means such as a weight 16. When swinging clockwise in opposition to the action of weight 16, valve 14 seals the end of leak port 13. The valve 14 is actuated selectively by two bi-metallic thermostatic bars 17 and 18 which operate in reverse senses. Bar 17 which controls heating effect, flexes to close the valve on rise of temperature, while bar 18, which controls cooling effect, flexes to close the valve on fall of temperature.

The bars are independently adjustable, each being mounted on an independent pivotally adjustable base of known form. Bar 17 is mounted on base 19, pivoted on a horizontal axis at 21 and adjustable by stop-screw 22 with indicating pointer 23. Bar 18 is mounted on base 24 pivoted at 25 in a horizontal axis and adjustable by screw 26 with indicating pointer 27. The stop screws limit the motion of the bars inward (toward valve 14) and springs not visible in the drawings, are used to hold the bases against the stop screws. This mode of adjusting such bars is well known in the art. (See Fortier 1,597,350 August 24, 1926).

The bar 17 carries near its upper end a boss 28 and the bar 18 carries a similar boss 29 which are alternately engaged respectively by cams 31, 32, on shaft 33 rotatably supported by frame 12. A crank pin 34 on cam 32 engages in a longitudinal slot in the end of lever 35 which is pivoted at 36 on base 12, so that when lever 35 swings outward from the position shown in Fig. 1, cams 31 and 32 turn clockwise. In Fig. 1 bar 17 is active and bar 18 is inactive, being held out by the engagement of cam 32 with boss 29. If the cams be rotated clockwise, cam 31 engages boss 28, forcing bar 17 to inactive position while cam 32 clears boss 29 and allows bar 18 to move in to active position.

The lever 35 is drawn inward by two tension springs 37 each connected to the end of a corresponding arm 36 and to base 12. Arms 36 are pivoted on lever 37 and are adjustable to vary the spring tension by means of screws 39. The bar 35 may be forced outward by fluid pressure acting in a bellows motor 41 supported on frame 12 and connected by passage 42 with main air supply line 43.

The line 43 receives its air through a three-way valve 44 either from a relatively high pressure source 45 or a relatively low pressure source 46. When connected to the high pressure source 45 bellows 41 overpower springs 37, but not when connected to low pressure source 46. Hence valve 44 controls the selection between thermostatic bars 17 and 18.

This mechanism is similar to that disclosed in the Fortier Patent No. 1,597,350, above identified, but differs therefrom in two important respects. The thermostatic bars in the present structure respond reversely to similar temperature changes and each bar is forced back selectively to render it inoperative.

The radiator valve is indicated at 47. The valve has an opening tendency, but may be forced closed by air under pressure acting in bellows motor 48.

The valve and valve motor will be recognized as of a well known commercial construction. While, as suggested, the leak port 18 might operate according to known principles to regulate the pressure in the bellows motor 48 by venting this motor at a rate which varied above and below the rate of supply of compressed air thereto, it is preferred to interpose between the leak port 13 and the radiator valve motor 48 a relay which secures more rapid response of the valve motor to the opening and closing of the leak port, and preferably also establishes a somewhat higher pressure in the valve motor than that directly established by the leak port. To accomplish this purpose I make use of a so-called intermediate or progressive relay 51. For purpose of illustration I have chosen the relay described and claimed in the Otto Patent 1,500,260, July 8, 1924.

This relay, generally stated, comprises a differential diaphragm mechanism which operates a combined admission and exhaust valve connected to the valve motor 48 to admit and exhaust compressed air to and from the latter. In the relay there is a relatively large diaphragm 52 which responds to the pressure in the chamber 53, and a relatively smaller diaphragm 54 which responds to the pressure in chamber 55. The space between the diaphragms is vented to atmosphere by means of atmospheric ports 56.

Connected to the centers of the two diaphragms and causing them to move together is a ported hub structure 57 which has an axial port vented to the space between the two diaphragms, which, as stated, is at atmospheric pressure. A spring urged conical valve 58 coacts with the end of the axial port in the hub 57 to control exhaust from the chamber 55, and also coacts with a seat 59 in the body of the valve to control supply of compressed air from a passage 61 to the chamber 55. The compression spring 62 assists the pressure acting in the chamber 55.

The leak port 13 is connected by a pipe 63 and passage 64 with the chamber 53. Further, the passage 61 which is connected by pipe 65 with the supply line 43 is connected by way of an adjustable throttle valve 66 with the chamber 53. The valve 66 is so adjusted that the supply of air to the chamber 53 past the valve 66 is less than the venting capacity of the leak port 13 when fully open. Consequently, the opening and closing of the leak port 13 controls the pressure in chamber 53 and consequently the pressure acting on the larger diaphragm 52. As this pressure varies, the valve 58 is caused to coact with the admission and exhaust seats to establish a higher or related pressure in the chamber 55. This pressure is communicated by way of the duct 67 and pipe 68 to the bellows motor 48 which actuates the radiator valve 47.

While I have shown a progressive or intermediate type of relay, various other relays are known, and may be used, whether of the intermediate or of the well known positive type.

While the invention might be applied to the control of a single thermostat and radiator, it attains its greatest utility in conjunction with systems in which a plurality of radiators are controlled by a plurality of corresponding thermostats. The connections for such an installation are indicated diagrammatically in Fig. 4. In this view the main parts described with reference to Figs. 1 to 3 inclusive, are indicated by similar reference numerals. The radiators are shown at 69, the supply pipes at 71, and return pipe at 72. It will be apparent from what has already been described, that the valve 44 determines which of the thermostatic bars 17 or 18 controls. When set for winter conditions, as shown in Figs. 1 and 4, the bar 17 controls to close the valve on rise of temperature, while when set for summer conditions, in which a cooling medium will be circulated through the radiators, thermostatic bar 18 is placed in control and closes the regulatory valve on fall of temperature.

It will be observed that the bars are independently adjustable and that the shift of control from one bar to another not only reverses the action of the thermostat, but may change the temperature which the thermostat operates to maintain. This is a useful feature, because as a general rule the temperature maintained by cooling in summer is somewhat higher than that maintained by heating in winter. If it is desired to maintain a uniform temperature under both conditions, the thermostatic bars may be adjusted accordingly.

While a particular embodiment has been described in considerable detail, modifications are possible within the scope of the invention.

What is claimed is,—

1. The combination of regulating means for controlling the flow of heat exchanging medium; pneumatic motor means for actuating said regulating means; a thermostatic valve mechanism for controlling said motor means; and means for reversing, with respect to temperature, the action of said thermostatic valve mechanism on said motor means.

2. The combination of regulating means for controlling the flow of heat exchanging medium; pneumatic motor means for actuating said regulating means; a thermostatic valve mechanism for controlling said motor means; and pressure controlled means for reversing, with respect to temperature, the action of said thermostatic valve mechanism on said motor means.

3. The combination of regulating means for controlling the flow of heat exchanging medium; pneumatic motor means for actuating said regulating means; a thermostatic valve mechanism including two thermally responsive elements arranged to respond in reverse senses to temperature changes; and means for rendering said elements selectively operative to control said motor means.

4. The combination of regulating means for controlling the flow of heat exchanging medium; pneumatic motor means for actuating said regulating means; a thermostatic valve mechanism including two thermally responsive elements arranged to respond in reverse senses to temperature changes; and pressure actuated means for rendering said elements selectively operative to control said motor means.

5. The combination of regulating means for controlling the flow of heat exchanging medium; pneumatic motor means for actuating said regulating means; a thermostatic valve mechanism including two thermally responsive elements arranged to respond in reverse senses to temperature changes; means for rendering said elements selectively operative to control said motor means; and means for individually adjusting said thermally responsive elements to change their temperatures of response.

6. The combination of a plurality of regulating means each controlling the flow of heat exchanging medium to a corresponding point of use; a plurality of thermostatic devices of the pneumatic leak port type, one for each of said regulating means, said thermostatic devices each including two thermally responsive elements arranged to respond in relatively reverse senses to the same temperature change; and a controlling device common to all said thermostatic devices and including means responsive to the pressure of pneumatic supply and functioning to place the thermally responsive elements selectively in controlling relations with the corresponding regulating means, and means for varying the pressure of pneumatic supply.

CARL A. OTTO.